(12) United States Patent
Terada

(10) Patent No.: US 12,504,529 B2
(45) Date of Patent: Dec. 23, 2025

(54) RADAR DEVICE, RADAR SYSTEM, AND RADAR METHOD

(71) Applicant: Mitsubishi Electric Corporation, Tokyo (JP)

(72) Inventor: Tsubasa Terada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 294 days.

(21) Appl. No.: 18/209,543

(22) Filed: Jun. 14, 2023

(65) Prior Publication Data
US 2023/0341537 A1  Oct. 26, 2023

Related U.S. Application Data

(63) Continuation of application No. PCT/JP2021/004485, filed on Feb. 8, 2021.

(51) Int. Cl.
*G01S 13/46* (2006.01)
*G01S 13/50* (2006.01)
*G01S 13/931* (2020.01)

(52) U.S. Cl.
CPC ............ *G01S 13/46* (2013.01); *G01S 13/505* (2013.01); *G01S 13/931* (2013.01)

(58) Field of Classification Search
CPC ....... G01S 13/46; G01S 13/505; G01S 13/931
See application file for complete search history.

(56) References Cited

U.S. PATENT DOCUMENTS

2013/0321199 A1* 12/2013 Suwa .................. G01S 13/5246
  342/195
2015/0355322 A1* 12/2015 Oshima ................ G01S 13/003
  342/116

FOREIGN PATENT DOCUMENTS

| JP | 2013-29420 A | 2/2013 |
| JP | 2013-44642 A | 3/2013 |
| JP | 2015-72173 A | 4/2015 |

(Continued)

OTHER PUBLICATIONS

Colone et al., "A Multistage Processing Algorithm for Disturbance Removal and Target Detection in Passive Bistatic Radar," IEEE Transactions on Aerospace and Electronic Systems, Apr. 2009, vol. 45, No. 2, pp. 698-722.

(Continued)

*Primary Examiner* — Vladimir Magloire
*Assistant Examiner* — Nazra Nur Waheed
(74) *Attorney, Agent, or Firm* — Birch, Stewart, Kolasch & Birch, LLP

(57) ABSTRACT

A radar device includes a signal reception unit that acquires reception signals of transmission waves transmitted from transmission antennas, a transmission signal acquisition unit that receives transmission waves transmitted from the transmission antennas by using transmission signal acquisition antennas, and acquires received reception signals as transmission signal replicas, an unnecessary signal suppression unit that suppresses unnecessary signals of the reception signals acquired by the signal reception unit, a cross-correlation operation unit that calculates cross-correlation values between the transmission signal replicas and the reception signals including the suppressed unnecessary signals, and a beam formation unit that forms beams and estimates a direction of a target by using cross-correlation values corresponding to the respective transmission signals.

5 Claims, 3 Drawing Sheets

(56) References Cited

FOREIGN PATENT DOCUMENTS

JP          5930139 B1    6/2016
WO    WO-2016199216 A1 * 12/2016  ............. G01S 13/46

OTHER PUBLICATIONS

International Search Report (PCT/ISA/210) issued in PCT/JP2021/004485, dated Mar. 9, 2021.
Indian Office Action and Search Report for Indian Application No. 202347034724, dated Jun. 24, 2025, with English translation.

* cited by examiner

FIG. 4
| Item | Value |
| --- | --- |
| Number of Transmission Antennas | 2 |
| Number of Reception Antennas | 1 |
| Correlated Wave Correlation Coefficient | 0.5 |
| Desired Signal to Noise Power Ratio | 30 dB |
| Direct Arrival Signal to Noise Power Ratio | 60 dB |
| DOD True Value | 40 deg |
FIG. 5A
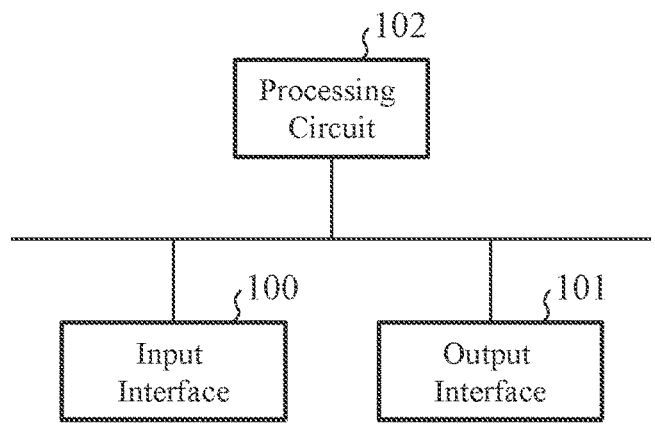
FIG. 5B
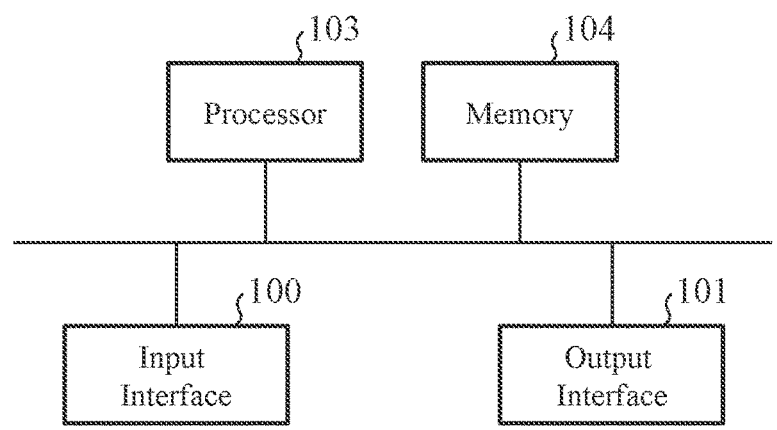

RADAR DEVICE, RADAR SYSTEM, AND RADAR METHOD

CROSS REFERENCE TO RELATED APPLICATIONS

This application is a Continuation of PCT International Application No. PCT/JP2021/004485 filed on Feb. 8, 2021, which is hereby expressly incorporated by reference into the present application.

TECHNICAL FIELD

The present disclosure relates to a radar device, a radar system, and a radar method.

BACKGROUND ART

A conventional technique that performs detection and position measurement of a target by using communication waves transmitted from an existing transmission station includes a passive radar device. The passive radar device detects a target based on cross-correlations between transmission waves transmitted from the transmission station and arriving target reflection waves reflected by the target, and estimates propagation distances of the communication waves from the target, and arrival angles of the communication waves, and thereby measures a position of the target.

At reception antennas included in the passive radar device, the target reflection waves that are detection targets and, in addition, direct waves from the transmission station or multipath waves that do not substantially have Doppler components such as clutters arrive. When the multipath waves have higher power than those of the target reflection waves, target detection performance of the passive radar device deteriorates, and position measurement of the target becomes difficult.

As for a conventional technique for solving this problem, for example, a method described in Non-Patent Literature 1 suppresses multipath waves by subtracting the multipath waves from reception signals, and leaves only target reflection waves.

CITATION LIST

Non-Patent Literatures

Non-Patent Literature 1: F. Colone, D. W. O'Hagan, P. Lombardo and C. J. Baker, "A Multistage Processing Algorithm for Disturbance Removal and Target Detection in Passive Bistatic Radar," in IEEE Transactions on Aerospace and Electronic Systems, vol. 45, no. 2, pp. 698-722, April 2009.

SUMMARY OF INVENTION

Technical Problem

In recent years, as for a transmission system of improving a transmission speed, Space Division Multiplexing Multiple-Input Multiple-Output (SDM-MIMO) for transmitting different signals from a plurality of respective transmission antennas is gaining attention. Although the method described in Non-Patent Literature 1 suppresses multipath waves in a case where transmission signals are SDM-MIMO transmission signals, a transmission wave transmitted from each transmission antenna is superimposed on a target reflection wave.

In a case where transmission waves transmitted from a plurality of transmission antennas are uncorrelated, a reception signal can be demultiplexed per transmission signal by finding a cross-correlation between the transmission signal and the reception signal for the target reflection wave. If a reception signal can be demultiplexed per transmission wave, it is possible to improve target detection performance that uses transmission Digital Beam Forming (DBF), and it is also possible to estimate a Direction of Departure (DOD) used for position measurement of a target.

However, there is a problem that, in a case where transmission waves transmitted from a plurality of transmission antennas are correlated, the transmission waves interfere with each other, and the method described in Non-Patent Literature 1 cannot demultiplex reception signals and therefore has difficulty in performing transmission DBF and DOD estimation.

The present disclosure solves the above problem, and an object of the present disclosure is to provide a radar device, a radar system, and a radar method that can perform transmission DBF and DOD estimation even when SDM-MIMO transmission signals are used.

Solution to Problem

A radar device according to the present disclosure is a radar device to perform detection and position measurement of a target by using a radio wave of a transmission signal transmitted from each of a plurality of transmission antennas, and includes: signal reception circuitry to receive a transmission wave transmitted from each of the transmission antennas by using a reception antenna, and acquire a reception signal; transmission signal acquisition circuitry to receive a transmission wave transmitted from each of the transmission antennas by using a transmission signal acquisition antenna, and acquire a received reception signal as a transmission signal replica; unnecessary signal suppression circuitry to suppress a first signal obtained by giving, to the transmission signal replica, a propagation delay time of the transmission wave, and suppress a second signal obtained by giving, to the transmission signal replica transmitted from each of the plurality of transmission antennas except a target transmission antenna, a propagation delay time of the transmission wave and phase rotation matching a Doppler frequency of the target, from the reception signal acquired by the signal reception circuitry; cross-correlation operation circuitry to calculate a cross-correlation value between the transmission signal replica and the reception signal in which the first and second signals are suppressed by the unnecessary signal suppression circuitry; and beam formation circuitry to form a beam and estimate a direction of the target by using the cross-correlation value corresponding to the transmission signal.

Advantageous Effects of Invention

According to the present disclosure, transmission waves transmitted from transmission antennas of a transmission station are received by using transmission signal acquisition antennas, transmission signal replicas are acquired, unnecessary signals of reception signals are suppressed, cross-correlation values between the transmission signal replicas and the reception signals including the suppressed unnecessary signals are calculated, and beams are formed and a direction of a target is estimated by using the cross-correlation values corresponding to the respective transmission signals. Consequently, the radar device according to the present disclosure can perform transmission DBF and DOD estimation even when SDM-MIMO transmission signals are used.

BRIEF DESCRIPTION OF DRAWINGS

FIG. 4 is a table illustrating various elements of a radar method used for the simulation in FIG. 3.

FIG. 5A is a block diagram illustrating a hardware configuration that implements functions of the radar device according to Embodiment 1, and FIG. 5B is a block diagram illustrating a hardware configuration that executes software that implements the functions of the radar device according to Embodiment 1.

DESCRIPTION OF EMBODIMENTS

Embodiment 1

Figure 1:
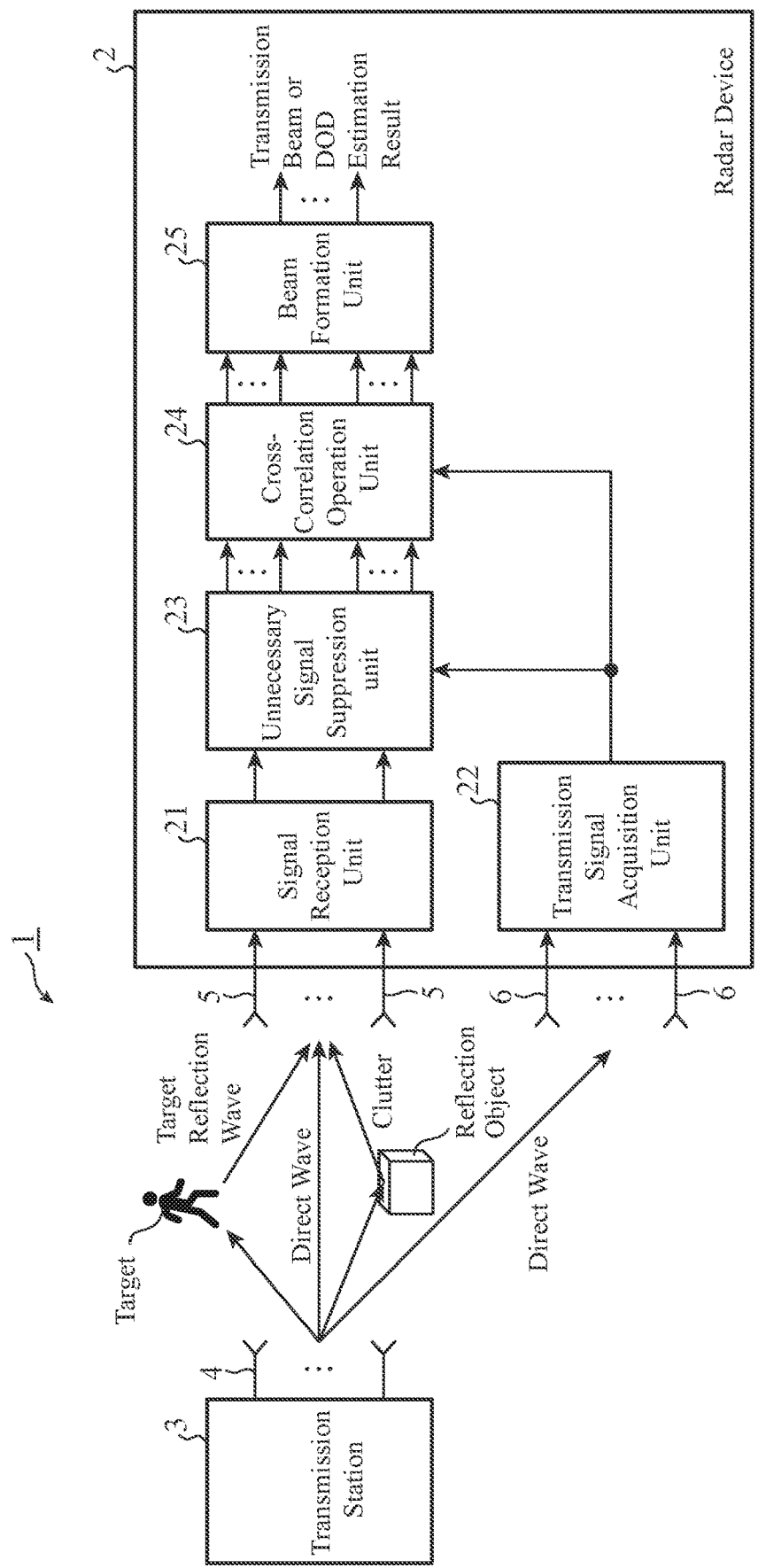
FIG. 1 is a block diagram illustrating a configuration of a radar system according to Embodiment 1.

FIG. 1 is a block diagram illustrating a configuration of a radar system 1 according to Embodiment 1. In FIG. 1, the radar system 1 is a system that performs detection and position measurement of a target, and includes a radar device 2 and a transmission station 3. The transmission station 3 emits radio waves to space by using a plurality of transmission antennas 4 without cooperating with the radar device 2. For example, the transmission station 3 is a transmission station that performs SDM-MIMO transmission, and transmits a different signal as the radio wave from each transmission antenna 4 by using each of the plurality of transmission antennas 4. Transmission waves transmitted from the transmission antennas 4 arrive at the radar device 2 via a plurality of routes as illustrated in FIG. 1.

For example, a transmission wave having been reflected by a target and arrived at the radar device 2 among the transmission waves transmitted from the transmission antennas 4 is a target reflection wave, and a transmission wave having directly arrived at the radar device 2 from the transmission station 3 without being reflected by an object including the target is a direct wave. The target reflection wave also includes a multipath wave that is multiple reflected by objects other than the target, and arrives at the radar device 2. Furthermore, a transmission wave having been reflected by objects other than the target and arrived at the radar device 2 among the transmission waves transmitted from the transmission antennas 4 is a clutter. Furthermore, the direct waves from the transmission station 3 to the radar device 2 arrive at also transmission signal acquisition antennas 6 described later.

The radar device 2 performs detection and position measurement of a target by using a radio wave of a transmission signal transmitted from each of the plurality of transmission antennas 4. The radar device 2 includes a plurality of reception antennas 5 and the plurality of transmission signal acquisition antennas 6, and the radio waves transmitted from the transmission station 3 are received by using the reception antennas 5 and the transmission signal acquisition antennas 6. The radar device 2 includes a signal reception unit 21, a transmission signal acquisition unit 22, an unnecessary signal suppression unit 23, a cross-correlation operation unit 24, and a beam formation unit 25.

The signal reception unit 21 receives the transmission waves transmitted from the transmission antennas 4 by using the reception antennas 5, and acquires reception signals. For example, the signal reception unit 21 acquires the reception signals by generating the reception signals by performing reception processing such as analog/digital conversion (hereinafter described as A/D conversion) on the signals received by using the reception antennas 5.

The transmission signal acquisition unit 22 receives the transmission waves transmitted from the transmission antennas 4 by using the transmission signal acquisition antennas 6, and acquires the received reception signals as transmission signal replicas.

Furthermore, the transmission signal acquisition unit 22 restores the transmission signal replicas by demodulating the reception signals of the transmission waves having reduced multipath influences among the transmission waves transmitted from the transmission antennas 4. For example, the transmission signal acquisition unit 22 acquires, as the transmission signal replicas, the reception signals of the transmission waves transmitted from the transmission antennas 4 for which directional beams have been formed, and having the reduced multipath influences. Consequently, it is possible to prevent deterioration of unnecessary wave suppression capability even when transmission signals acquired in multipath environment by the transmission signal acquisition unit 22 are used. Note that the reception antennas 5 used by the signal reception unit 21 and the transmission signal acquisition antennas 6 used by the transmission signal acquisition unit 22 may be identical antennas.

The unnecessary signal suppression unit 23 suppresses unnecessary signals of the reception signals acquired by the signal reception unit 21. The unnecessary signals include, for example, a signal of a direction wave component, a signal of a clutter component, a signal of a multipath wave component, and an interference signal of a Doppler frequency of a target. The unnecessary signal suppression unit 23 suppresses the unnecessary signal, by using a projection matrix that suppresses a signal vector obtained by giving, to the transmission signal replica, both a propagation delay time of the transmission wave, and phase rotation matching the Doppler frequency of the target.

The cross-correlation operation unit 24 calculates a cross-correlation value between the transmission signal replica and the reception signal including the suppressed unnecessary signal. The beam formation unit 25 forms a transmission beam or estimates a DOD for estimating a direction of the target by using the cross-correlation value corresponding to each transmission signal and calculated by the cross-correlation operation unit 24. For example, the beam formation unit 25 forms a beam by adding, to each of the transmission signals, a value obtained by multiplying a complex amplitude and the cross-correlation value corresponding to each of the transmission signals. Furthermore, the beam formation unit 25 estimates a DOD for estimating the direction of the target by using a phase difference or a power difference of the cross-correlation value corresponding to each transmission signal.

Figure 2:
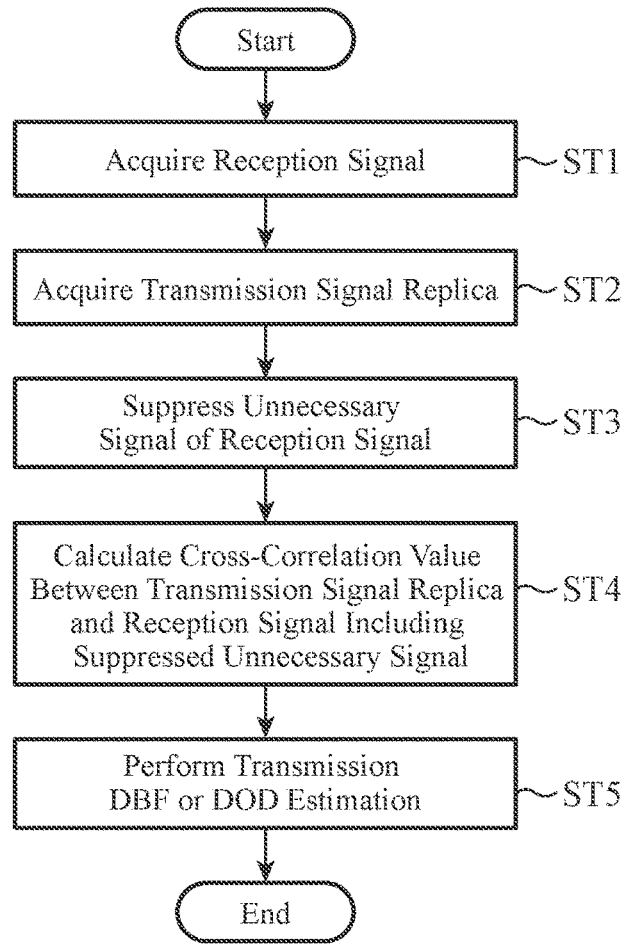
FIG. 2 is a flowchart illustrating a radar method according to Embodiment 1.

FIG. 2 is a flowchart illustrating a radar method according to Embodiment 1.

The signal reception unit 21 acquires reception signals by using the reception antennas 5 (step ST1). The transmission signal acquisition unit 22 receives transmission waves transmitted from the transmission antennas 4 by using the transmission signal acquisition antennas 6, and acquires the received reception signals as transmission signal replicas (step ST2).

A signal of a radio wave transmitted from a transmission antenna $n_t$ and received by a reception antenn 20a $n_r$ is acquired as a reception signal $y_{nt, nr}$ (t) by the signal reception unit 21. The reception signal $y_{nt, nr}$ (t) is expressed by the following equation (1).

$$y_{n_t,n_r}(t) = \alpha_{n_t,0} x_{n_t}(t - \tau_{n_t,0}) + \sum_{k=1}^{K_{n_t,n_r}} \alpha_{n_t}, \quad (1)$$
$$n_r, k x n_t(t - \tau_k) + \beta_{n_t} x_{n_t}(t - \eta) \exp(j2\pi f_d t)$$

The first term on a right side of the above equation (1) is a direct wave component included in the reception signal $y_{nt, nr}$ (t). The second term on the right side of the above equation (1) is a clutter component included in the reception signal $y_{nt, nr}$ (t). The third term on the right side of the above equation (1) is a target reflection wave component included in the reception signal $y_{nt, nr}$ (t). In the above equation (1), $\alpha$ and $\beta$ each represent a complex amplitude that indicates, for example, an attenuation amount of a signal of each component. $\tau$ and $\eta$ each represent a delay time of a transmission wave of each component. $K_{nt, nr}$ represents the number of clutters. $f_{d}$ represents a Doppler frequency of a target 1.

In a case where a total number of the plurality of transmission antennas 4 is $N_t$, reception signals $y_{nr}$ (t) for all of the transmission antennas 4 can be expressed by the following equation (2) by adding noise $z_{nr}$ (t) to each of the reception signals $y_{nt, nr}$ (t) the number of which corresponds to the total number $N_t$ of the transmission antennas 4.

$$y_{n_t}(t) = \sum_{n_t=1}^{N_t} y_{n_t}, n_r(t) + z_{n_t}(t) \quad (2)$$

A passive radar device generally discretizes an arrival signal by performing A/D conversion on the arrival signal.

The signal reception unit 21 converts the reception signal $y_{nt}$ (t) subjected to the A/D conversion at a sampling frequency $f_s$ (Hz) and discretization, into a vector $y_{nt}$ whose sampling directions are elements of the vector, as expressed in the following equation (3). Note that M represents the number of samples in the following equation (3).

$$y_{n_t} = (y_{n_t}(0), y_{n_t}(1/f_s), \ldots, y_{n_t}((M-1)/f_s))^T \quad (3)$$

The transmission signal is a signal subjected to digital modulation such as Amplitude Shift Keying (ASK), Phase Shift Keying (PSK), or Quadrature Amplitude Modulation (QAM).

In a case where a symbol rate is $f_b$ (Symbol/s) and A/D conversion is performed with an I component and a Q component, a relation of $f_b \leq f_s$ holds, and, in a case where A/D conversion is performed with the I component alone, a relation of $2f_b \leq f_s$ holds.

In a case where these relations hold, a transmission signal $x_{nt}$ (t) has a relation of the following equation (4). $f_c$ (Hz) represents a carrier frequency in the following equation (4). Furthermore, the delay time t has a relation of $0 \leq \tau < 1/f_s$. That is, a transmission signal that propagates with an arbitrary delay time can be expressed by the following equation (4) that has given phase rotation to a transmission signal at a certain discretized point.

$$x_{n_t}(m/f_s + \tau) = x_{n_s}(m/f_s) \exp(j2\pi f_c \tau)$$

or $$x_{n_t}(m/f_s + \tau) = x_{n_t}((m+1)/f_s) \exp(-j2\pi f_c (1/f_s - \tau)) \quad (4)$$

In view of the above relations, vector representation of the reception signal $y_{nt, nr}$ (t) expressed by the above equation (1) can be expressed by the following equations (5) to (9). Furthermore, in the following equation (5), $x_{nt, 0}$ represents a transmission signal vector of M×1 sampled at a $1/f_s$(s) interval with a point of time $t=\tau_{nt, 0}$ serving as a reference point. $x_{nt, nt (clt)}$ represents a transmission signal matrix of M×$K_{nt, nr}$ obtained by performing similar sampling on arriving $K_{nt, nr}$ transmission signals. $x_{nt, n\tau(tgt)}$ is a transmission signal matrix of M×1 obtained by performing similar sampling on target reflection waves.

diag (·) represents processing of converting each element of a vector into each element of a diagonal matrix in the following equation (7).

$$y_{n_t,n_r} = \quad (5)$$
$$\alpha_{n_t,0} x_{n_t,0} + X^{(clt)}_{n_t,n_r} \alpha_{n_t,n_r} + \beta_{n_t,n_r} D x^{(tgt)}_{n_t,n_r} = X^{(sup)}_{n_t,n_r} \alpha^{(sup)}_{n_t,n_r} + \beta_{n_t,n_r} D_{f_d} x^{(tgt)}_{n_t,n_r}$$

$$\alpha_{n_t,n_r} = [\alpha_{n_t,n_r 1}, \ldots, \alpha_{n_t,n_r, K_{n_t,n_\tau}}]^T \quad (6)$$

$$D_{f_d} = \text{diag}(0 \ldots e^{j2\pi f_d (M-1)/f_s}) \quad (7)$$

$$X^{(sup)}_{n_t,n_r} = (x_{n_t,0}, X^{(clt)}_{n_t,n_r}) \quad (8)$$

$$\alpha^{(sup)}_{n_t,n_r} = (\alpha_{n_t,0}, \alpha^T_{n_t,n_r})^T \quad (9)$$

In view of the above, vector representation of the reception signal $y_{nr}$ (t) expressed by the above equation (2) can be expressed by the following equations (10) to (14).

Note that, in the following equations (10) to (14), for a complex amplitude of a signal of the target reflection wave reflected by the target and received by the reception antenna nr, substantially same distance attenuation occurs in each propagation route, and a phase shift occurs due to the reflection from the target. Hence, by setting $n_t=1$ as a reference, $\beta_{nt, nr} = \beta_{1, nr} \cdot e^{j2\pi(nt-1) d \cdot \sin(\theta_t)\lambda}$ can be expressed.

Furthermore, array antennas included in the transmission station 3 are uniform linear arrays that use the transmission antennas 4 as element antennas. d represents an element interval, $\lambda$ represents a wavelength of a center frequency of a transmission signal, and $\theta_t$ represents the DOD.

$$y_{n_r} = (X^{(sup)}_{1,n_r} \ldots X^{(sup)}_{N_t,n_r})(\alpha^{(sup)T}_{1,n_r} \ldots \alpha^{(sup)T}_{N_t,n_r})^T + \quad (10)$$
$$D_{f_d}(x^{(tgt)}_{1,n_r} \ldots x^{(tgt)}_{N_t,n_r})(\beta_{1,n_r} \ldots \beta_{N_t,n_t})^T + z_{n_t} =$$
$$X^{(sup)}_{n_t} \alpha^{(sup)}_{n_t} + \beta_{1, n_r} D_{f_d} X^{(tgt)}_{n_r} \alpha(\theta_t) + z_{n_r}$$

$$X^{(sup)}_{n_r} = (X^{(sup)}_{1,n_r} \ldots X^{(sup)}_{N_t,n_r}) \quad (11)$$

-continued $$\alpha_{n_r}^{(sup)} = \left(\alpha_{1,n_r}^{(sup)T} \ldots \alpha_{N_t,n_r}^{(sup)T}\right)^T \quad (12)$$

$$X_{n_r}^{(tgt)} = \left(x_{1,n_r}^{(tgt)} \ldots x_{N_t,n_r}^{(tgt)}\right) \quad (13)$$

$$\alpha(\theta_t) = \left(1 \ldots e^{j2\pi(N_T-1)d\cdot\sin(\theta_T)/\lambda}\right)^T \quad (14)$$

The unnecessary signal suppression unit 23 suppresses unnecessary signals of the reception signals acquired by the signal reception unit 21 (step ST3). For example, by solving a minimization problem expressed by the following equation (15) using the signals received by the signal reception unit 21 and the transmission signal replicas acquired by the transmission signal acquisition unit 22, the unnecessary signal suppression unit 23 suppresses the unnecessary signals including interferences between the transmission signals. Note that $W_{n_t, f}$ in the following equation (15) is expressed by the following equation (16).

In a case where the signals received by the transmission signal acquisition antennas 6 are influenced by multipath, when these reception signals are used as the transmission signal replicas, the minimization problem of the following equation (15) does not optimally operate, and unnecessary wave suppression capability deteriorates. Then, the transmission signal acquisition unit 22 restores the transmission signal replicas by demodulating the reception signals of the transmission waves not influenced by the multipath among the transmission waves transmitted from the transmission antennas 4. For example, the transmission signal acquisition unit 22 reduces the multipath influence and prevents the deterioration of the unnecessary wave suppression capability by forming directional beams at the transmission antennas.

$$\omega_{n_t,f} = \min_{\omega_{n_t,f}}\{\|y_{n_r} - W_{n_t,f}\omega_{n_t,f}\|^2\} = \left(W_{n_t,f}^H W_{n_t,f}\right)^{-1} W_{n_t,f}^H y_{n_r} \quad (15)$$

Note that $W_{n_t,f}$ is expressed by the following equation.

$$W_{n_t,f} = \left(S_{ECA}D_f S_{ECA}J_{n_t}\right) \quad (16)$$

In the above equation (16), $S_{ECA}$ can be expressed by the following equations (17) and (18) by using a transmission signal replica $x_{n_t}(t)$ hat obtained by the transmission signal acquisition unit 22. In this regard, L represents an assumed maximum sample delay amount.

$$S_{ECA} = \left(\hat{x}_1 \ldots \hat{x}_{N_t}\right) \quad (17)$$

$$\hat{x}_{n_t} = \begin{pmatrix} \hat{x}_{n_t}(0) & 0 & 0 \\ \hat{x}_{n_t}(1/f_s) & \hat{x}_{n_t}(0) & \ldots & 0 \\ \vdots & \vdots & & \vdots \\ \hat{x}_{n_t}((M-1)/f_s) & \hat{x}_{n_t}((M-2)/f_s) & & \hat{x}_{n_t}((M-L)/f_s) \end{pmatrix} \quad (18)$$

$D_f$ in the above equation (16) can be expressed by the following equation (19).

$$D_f = \text{diag}\left(0 \ldots e^{j2\pi f(M-1)/f_s}\right) \quad (19)$$

A matrix $J_{n_t}$ for selecting a column of $S_{ECA}$ other than $n_t$ can be expressed by the following equation (20) in a case of, for example, $N_t=4$ and $n_t=2$.

$$J_{n_t} = \begin{pmatrix} 1 & 0 & 0 \\ 0 & 0 & 0 \\ 0 & 1 & 0 \\ 0 & 0 & 1 \end{pmatrix} \quad (20)$$

By solving the above minimization problem, the unnecessary signal suppression unit 23 can suppress the direction wave components and the clutter components included in the reception signals, and further suppress interference signals of designated Doppler frequencies. A reception signal $z_{n_t, f}$ including the suppressed unnecessary signal can be expressed by the following equation (21). In this regard, $Q_{n_t, f}$ is a projection matrix in the following equation (21).

$$z_{n_t,n_r,f} = \left(I - W_{n_t,f}\left(W_{n_t,f}^H W_{n_t,f}\right)^{-1} W_{n_t,f}^H\right)y_{n_r} = Q_{n_t,f}y_{n_r} \quad (21)$$

Next, the cross-correlation operation unit 24 calculates a value of a cross-correlation $r_{n_t}(\tau, f)$ between the transmission signal replica $x_{n_t}(t)$ hat and the reception signal $z_{n_t, f}$ including the suppressed unnecessary signal (step ST4). For example, the cross-correlation operation unit 24 calculates a cross-correlation value between the transmission signal replica $x_{n_t}(t)$ hat and the reception signal $z_{n_t, f}$ including the suppressed unnecessary signal by using the delay time $\tau$ of an arbitrary range-Doppler map and a component of the Doppler frequency f. The cross-correlation $r_{n_t}(\tau, f)$ related to the designated $n_t$ and Doppler frequency f can be calculated using the following equation (25).

$$r_{n_t}(\tau, f) = \int_{-\infty}^{\infty} \hat{x}_{n_t}(t+\tau)z_{n_t,f}^*(t)e^{j2\pi ft}dt \quad (22)$$

The beam formation unit 25 forms a transmission beam or estimates a DOD for estimating the direction of the target by using the value of the cross-correlation $r_{n_t}(\tau, f)$ corresponding to each transmission signal and calculated by the cross-correlation operation unit 24. For example, the beam formation unit 25 performs transmission DBF or DOD estimation with influence of a correlation wave being suppressed by using a cross-correlation result of a transmission signal vector at the designated $n_t$ and f calculated by the cross-correlation operation unit 24.

When a cross-correlation of each transmission antenna (1, 2, ..., $N_t$) at a range-Doppler map position ($\tau$, f) is aligned, a vector $s_{n_r}$ is expressed by the following equation (23).

$$s_{n_r} = \begin{pmatrix} r_{1,n}(\tau, f) \\ \vdots \\ r_{N_t,n_r}(\tau, f) \end{pmatrix} \quad (23)$$

For example, the beam formation unit 25 can form an arbitrary beam by adding to, each of the transmission signals, a value obtained by multiplying an appropriate complex amplitude and a cross-correlation value of each element of $s_{n_r}$. As a result of this transmission DBF, the transmission beams equivalent to the directional beams of the transmission antennas 4 are output.

Furthermore, the beam formation unit 25 estimates a DOD for estimating the direction of the target by using a phase difference or a power difference of the cross-correlation value of each transmission signal, and outputs a DOD estimation result.

Figure 3:
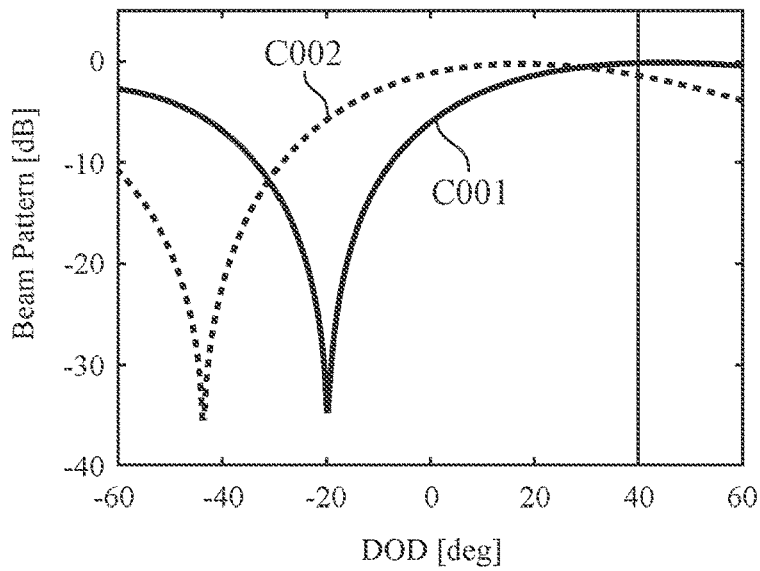
FIG. 3 is a graph illustrating a simulation result of transmission beam pattern formation.

FIG. 3 is a graph illustrating a simulation result of transmission beam pattern formation. Furthermore, FIG. 4 is a table illustrating various elements of the radar method used for the simulation in FIG. 3. The simulation result illustrated in FIG. 3 is a result in which the beam formation unit 25 has formed a transmission beam pattern using the phase difference of the cross-correlation value corresponding to each transmission signal, and the horizontal axis indicates the DOD, and the vertical axis indicates a beam pattern. The various elements set to a simulator that simulates the radar device 2 are values illustrated in FIG. 4.

Furthermore, the number of antennas is a minimum configuration that enables DOD estimation. For example, as illustrated in FIG. 4, the number of transmission antennas is two, and the number of reception antennas is one. Transmission signals are correlated. It is assumed that a direct wave and a target reflection wave having smaller power than that of the direction wave arrive at the reception antenna 5. Furthermore, a correlation wave correlation coefficient is 0.5, a desired signal to noise power ratio is 30 (dB), and a direct arrival signal to noise power ratio is 60 (dB).

In FIG. 3, data indicating a simulation result of transmission beam pattern formation by the radar device 2 is C001. Data indicating a simulation result of transmission beam pattern formation by a conventional method for comparison with C001 is C002. The conventional method is an Extensive Cancellation Algorithm (ECA) method described in Non-Patent Literature 1. The ECA method is $W_{nt,f}=S_{ECA}$ in the above equation (16).

A result of comparison between the data C001 and the data C002 shows that a peak of the transmission beam pattern asymptotically approaches 40 (deg) that is a DOD true value, and an error is reduced in the radar device 2. This results from that an operation of the above equation (21) is performed, and thereby unnecessary transmission signal components included in the target reflection waves are suppressed.

Functions of the signal reception unit 21, the transmission signal acquisition unit 22, the unnecessary signal suppression unit 23, the cross-correlation operation unit 24, and the beam formation unit 25 included in the radar device 2 are implemented by a processing circuit. That is, the radar device 2 includes the processing circuit that executes processing in steps ST1 to ST5 illustrated in FIG. 2. The processing circuit may be dedicated hardware, yet may be a Central Processing Unit (CPU) that executes programs stored in a memory.

FIG. 5A is a block diagram illustrating a hardware configuration that implements the functions of the radar device 2. FIG. 5B is a block diagram illustrating a hardware configuration that executes software that implements the functions of the radar device 2. In FIGS. 5A and 5B, an input interface 100 is an interface that relays signals output from the reception antennas 5 and the transmission signal acquisition antennas 6 to the radar device 2. An output interface 101 is an interface that relays a DOD estimation result or the like output from the radar device 2 to a device at a later stage.

In a case where the processing circuit is a processing circuit 102 that is dedicated hardware illustrated in FIG. 5A, the processing circuit 102 corresponds to, for example, a single circuit, a composite circuit, a programmed processor, a parallel programmed processor, an Application Specific Integrated Circuit (ASIC), a Field-Programmable Gate Array (FPGA), or a combination thereof. The functions of the signal reception unit 21, the transmission signal acquisition unit 22, the unnecessary signal suppression unit 23, the cross-correlation operation unit 24, and the beam formation unit 25 included in the radar device 2 may be implemented by different processing circuits, and these functions may be collectively implemented by one processing circuit.

In a case where the processing circuit is a processor 103 illustrated in FIG. 5B, the functions of the signal reception unit 21, the transmission signal acquisition unit 22, the unnecessary signal suppression unit 23, the cross-correlation operation unit 24, and the beam formation unit 25 included in the radar device 2 are implemented by software, firmware, or a combination of software and firmware. Note that the software or the firmware is described as a program and stored in a memory 104.

By reading and executing the programs stored in the memory 104, the processor 103 implements the functions of the signal reception unit 21, the transmission signal acquisition unit 22, the unnecessary signal suppression unit 23, the cross-correlation operation unit 24, and the beam formation unit 25 included in the radar device 2. For example, the radar device 2 includes the memory 104 that stores the programs for eventually executing the processing in steps ST1 to ST5 in the flowchart illustrated in FIG. 2 when the programs are executed by the processor 103. These programs cause a computer to execute a procedure or method of processing performed by the signal reception unit 21, the transmission signal acquisition unit 22, the unnecessary signal suppression unit 23, the cross-correlation operation unit 24, and the beam formation unit 25. The memory 104 may be a computer-readable storage medium that stores programs that cause the computer to function as the signal reception unit 21, the transmission signal acquisition unit 22, the unnecessary signal suppression unit 23, the cross-correlation operation unit 24, and the beam formation unit 25.

The memory 104 corresponds to, for example, a non-volatile or volatile semiconductor memory such as a Random Access Memory (RAM), a Read Only Memory (ROM), a flash memory, an Erasable Programmable Read Only Memory (EPROM), or an Electrically-EPROM (EEPROM), a magnetic disk, a flexible disk, an optical disk, a compact disk, a mini disk, a DVD or the like.

Some of the functions of the signal reception unit 21, the transmission signal acquisition unit 22, the unnecessary signal suppression unit 23, the cross-correlation operation unit 24, and the beam formation unit 25 included in the radar device 2 may be implemented by dedicated hardware, and some of the functions may be implemented by software or firmware. For example, the functions of the signal reception unit 21 and the transmission signal acquisition unit 22 are implemented by the processing circuit 102 that is the dedicated hardware, and the functions of the unnecessary signal suppression unit 23, the cross-correlation operation unit 24, and the beam formation unit 25 are implemented by the processor 103 reading and executing programs stored in the memory 104. As described above, the processing circuit can implement the above functions by hardware, software, firmware, or a combination thereof.

As described above, the radar device 2 according to Embodiment 1 includes the signal reception unit 21 that receives transmission waves transmitted from the transmission antennas 4 by using the reception antennas 5, and acquires reception signals, the transmission signal acquisition unit 22 that receives the transmission waves transmitted from the transmission antennas 4 by using the transmission signal acquisition antennas 6, and acquires received reception signals as transmission signal replicas, the unnecessary signal suppression unit 23 that suppresses unnecessary signals of the reception signals acquired by the signal reception unit 21, the cross-correlation operation unit 24 that calculates cross-correlation values between the transmission signal replicas and the reception signals including the suppressed unnecessary signals, and the beam formation unit 25 that forms beams and estimate a direction of a target by using the cross-correlation values corresponding to the respective transmission signals. Consequently, the radar device 2 can perform transmission DBF and DOD estimation even when SDM-MIMO transmission signals are used.

Note that any component according to the embodiment can be modified, or any component according to the embodiment can be omitted.

INDUSTRIAL APPLICABILITY

The radar device according to the present disclosure can be used to perform, for example, detection and position measurement on an obstacle around a vehicle.

REFERENCE SIGNS LIST

1: radar system, 2: radar device, 3: transmission station, 4: transmission antenna, 5: reception antenna, 6: transmission signal acquisition antenna, 21: signal reception unit, 22: transmission signal acquisition unit, 23: unnecessary signal suppression unit, 24: cross-correlation operation unit, 25: beam formation unit, 100: input interface, 101: output interface, 102: processing circuit, 103: processor, 104: memory

The invention claimed is:

1. A radar device to perform detection and position measurement of a target by using a radio wave of a transmission signal transmitted from each of a plurality of transmission antennas, the radar device comprising:
   signal reception circuitry to receive a transmission wave transmitted from each of the transmission antennas by using a reception antenna, and acquire a reception signal;
   transmission signal acquisition circuitry to receive a transmission wave transmitted from each of the transmission antennas by using a transmission signal acquisition antenna, and acquire a received reception signal as a transmission signal replica;
   unnecessary signal suppression circuitry to suppress a first signal obtained by giving, to the transmission signal replica, a propagation delay time of a corresponding one of the transmission waves from the reception antenna, and suppress a second signal obtained by giving, to the transmission signal replica transmitted from each of the plurality of transmission antennas except a target transmission antenna, a propagation delay time of a corresponding one of the transmission waves from the reception antenna and phase rotation matching a Doppler frequency of the target, from the reception signal acquired by the signal reception circuitry;
   cross-correlation operation circuitry to calculate a cross-correlation value between the transmission signal replica and the reception signal in which the first and second signals are suppressed by the unnecessary signal suppression circuitry; and
   beam formation circuitry to form a beam and estimate a direction of the target by using the cross-correlation value corresponding to the transmission signal.

2. The radar device according to claim 1, wherein the transmission signal acquisition circuitry restores the transmission signal replica by demodulating a reception signal of a transmission wave having a reduced multipath influence among transmission waves transmitted from each of the transmission antennas.

3. The radar device according to claim 2, wherein the transmission signal acquisition circuitry acquires the reception signal of a corresponding one of the transmission waves from the transmission signal acquisition antenna as the transmission signal replica, the transmission waves from the transmission signal acquisition antenna being transmitted from the transmission antennas for each of which a directional beam has been formed, and having the reduced multipath influence.

4. A radar system comprising:
   a transmission station to transmit the radio wave from each of the plurality of transmission antennas; and
   the radar device according to claim 1.

5. A radar method of performing detection and position measurement of a target by using a radio wave of a transmission signal transmitted from each of a plurality of transmission antennas, the radar method comprising:
   receiving a transmission wave transmitted from each of the transmission antennas by using a reception antenna, and acquiring a reception signal;
   receiving a transmission wave transmitted from each of the transmission antennas by using a transmission signal acquisition antenna, and acquiring a received reception signal as a transmission signal replica;
   suppressing a first signal obtained by giving, to the transmission signal replica, a propagation delay time of a corresponding one of the transmission waves from the reception antenna, and suppressing a second signal obtained by giving, to the transmission signal replica transmitted from each of the plurality of transmission antennas except a target transmission antenna, a propagation delay time of a corresponding one of the transmission waves from the reception antenna and phase rotation matching a Doppler frequency of the target, from the acquired reception signal;
   calculating a cross-correlation value between the transmission signal replica and the reception signal in which the first and second signals are suppressed; and
   forming a beam or estimating a direction of the target by using the cross-correlation value corresponding to the transmission signal.

* * * * *